United States Patent [19]

Kurokawa

[11] Patent Number: 4,903,682
[45] Date of Patent: Feb. 27, 1990

[54] WIRE SAW

[75] Inventor: Takayasu Kurokawa, Omihachiman, Japan

[73] Assignee: Technoslice Ltd., Kyoto, Japan

[21] Appl. No.: 275,645

[22] Filed: Nov. 23, 1988

Related U.S. Application Data

[63] Continuation of Ser. No. 44,328, Apr. 30, 1987, abandoned.

[51] Int. Cl.$^4$ .............................................. B28D 1/06
[52] U.S. Cl. .................................... 125/16 R; 125/21; 83/651.1
[58] Field of Search .................. 83/746, 651.1, 790, 83/793; 125/16 R, 21; 51/148

[56] References Cited

U.S. PATENT DOCUMENTS 3,942,508  3/1976  Shimizu .......................... 125/16 R
4,494,523  1/1985  Wells ............................. 83/651.1

FOREIGN PATENT DOCUMENTS 70493   6/1977  Japan ............................ 125/16 R
591328  2/1978  U.S.S.R. ........................ 125/16 R Primary Examiner—Douglas D. Watts
Assistant Examiner—Eugenia A. Jones
Attorney, Agent, or Firm—Cushman, Darby & Cushman

[57] ABSTRACT

A wire saw having a wire gradually moved from a wire feeding unit to a wire withdrawing unit by a reciprocal movement of the wire on a group of rolls caused by the movement of movable rollers toward or away from fixed rollers, and in which the transmission of a drive force to a roll of the group rolls is performed by using an endless transmission strip wound around movable guide rings and fixed guide rings, and the movements of the movable rollers toward or away from the fixed roller and of the movable guide rings toward or away from the fixed rings are simultaneously performed in a rectilinear direction both upstream and downstream of the roll group.

4 Claims, 1 Drawing Sheet

WIRE SAW

This is a continuation of application Ser. No. 044/328 filed Apr. 30, 1987 which was abandoned upon the filing hereof.

BACKGROUND OF THE INVENTION

1. Field of the Invention

The present invention relates to a wire saw. More particularly, it relates to a differential type rotational wire saw having a wire supplied from a wire feeding unit, suspended by movable and fixed rollers in an area upstream and an area downstream and wound around a group of rolls, at least one of which is driven. The wire is gradually moved to a wire withdrawing unit by a reciprocal movement of the wire over the group of rolls caused by the approach or separation movements of the movable rollers with regard to the position of the fixed rollers.

2. Description of the Related Art

The above-mentioned type of the wire saw is disclosed in Japanese Examined Patent Publication (Kokoku) NO. 56-198 and NO. 56-199.

The wire saw disclosed in these publications has the following constitution. Namely in an area upstream and an area downstream of a group of rolls having the wire wound therearound, a set of a plurality of fixed rollers aligned on the same axis as the former group of rolls is arranged at the right side and left sides of a frame of the wire saw, and a swing lever, the center of which is supported at a position lower that a position midway between the fixed rollers on the right side and the fixed rollers on the left side, is provided, and a plurality of movable rollers aligned on the same axis as the group of rollers is arranged at both ends of the swing lever. The wire is wound around the fixed rollers and the movable rollers, and an approaching movement i.e., toward the fixed roller, and a separating movement i.e., away from the fixed roller of the movable roller on the swing lever are applied by movement of the swing lever, to simultaneously generate a slackness in the wire and to absorb the slackness generated upstream and downstream of the roll group, and the wire is then gradually advanced to a withdrawing roller by reciprocal movement of the roll group.

However, this wire saw has a problem in that the wire is easily broken during the advancing movement by the reciprocal movement thereof, and it appears that this breakage of the wire is caused by an irregular tension of the wire. Namely, the movable rollers on the swing lever are moved in a circular locus by the movement of the swing lever. Therefore, when the movable rollers approach the fixed rollers or move away from the fixed rollers along the circular locus, the speed of the movable rollers arranged on the one end of the swing lever and approaching the fixed roller is slightly different to the speed of the movable rollers arranged on the other end of the swing lever and moving away from the fixed roller during the swinging motion of the swing lever.

When there is the difference between the speed of the rollers approaching the fixed rollers and the speed of the rollers moving away from the fixed rollers, a difference in the amount of slack caused in the wire and the amount of take up of that slack is caused by the above-mentioned speed difference. Also, since the wire is wound around several turns on both sets of rollers, the difference between the amount of slack and the amount of take up cause an irregular tension in the wire.

Further, since the swinging movement of the swing lever is performed independently from the operations of the wire supplying unit and the wire withdrawing unit, even if the roll group is driven in synchronism with the swinging movement of the swing lever, the irregularity of the tension of the wire is worsened, so that the wire will be broken the excess load applied to the wire.

SUMMARY OF THE INVENTION

An object of the present invention is to provide the above-mentioned differential type in which the disadvantages thereof as described above are avoided.

The object of the present invention can be attained by a rotational wire saw having the following features:

(1) An endless transmission strip is used to drive at least one roll of the roll group.

(2) The endless transmission strip is suspended by fixed guide rings and movable guide rings, the movable guide rings being capable of moving toward or away from the fixed guide rings, in an area upstream and an area downstream of the roll group.

(3) The movements of the movable rollers toward or away from the fixed rollers and the movement of movable guide rings toward or away from fixed guide rings in the area upstream of the roll group is simultaneously performed in a rectilinear direction together with the movements of the movable rollers away from or toward the fixed rollers and the movements of the movable guide rings away from or toward the fixed guide rings in the area downstream of the roll group.

Since the roll group is driven by the endless transmission strip, it is not necessary to provide a complicated drive mechanism for the roll group.

The endless transmission strip is suspended on the fixed guide rings and the movable guide rings located upstream and downstream of the position from which the drive force is transmitted to the roll group, the movable guide rings are moved towards or away from the fixed guide rings in accordance with the amount of slack in the wire and amount of slack taken up, and simultaneously, the generation of slack in the transmission strip and the take up of the slack are carried out by the to and from movement of the movable guide rings.

When the movement of the movable rollers toward or away from the fixed rollers and of the movable guide rings toward or away from the fixed guide rings upstream of the roll group, and the movement of the movable rollers away from or toward the fixed rollers and of the movable guide rings away from or toward the fixed guide rings downstream of the roller group are simultaneously performed in a rectilinear direction, the amount of slack generated in the wire and the amount of take up thereof upstream of the roll group and the amount of slack generated in the wire and the amount of take up thereof downstream of the roll group become the same. Further, the amount of slack generated in the endless transmission strip and the amount of take up thereof upstream of the roll group, and the amount of slack generated in the endless transmission strip and the amount of take up thereof downstream of the roller group, also become the same.

Accordingly, the circumferential speed in both a normal direction and a reverse direction of rotation of the drive roll in the roll group always coincide with the speed of travel in a normal direction and a reverse direction of the wire.

Therefore, since the wire is not affected by the movement of the movable rollers toward or away from the fixed roller, or a variance in the circumferential speed of the drive roll of the roll group, the tension of the wire is always constant.

The number of movable rollers or movable guide rings utilized can be one or more.

As described hereinbefore, the movements of the movable rollers toward or away from the fixed rollers, and the movements of the movable guide rings toward or away from the fixed guide rings are performed in the rectilinear direction, but the directions and distances of the rectilinear movements of the movable rollers and the movable guide rings need not always be the same. When there are differences in the direction and the distance of the movements of the movable rollers and those of the movable guide rings, those differences may be adjusted by adjusting the number of movable rollers and/or the movable guide rings provided, or by using a variable speed means to make the circumferential speed in the normal direction and the reverse direction of the rotational movement of the drive roll coincide with the speed of travel in the normal direction and the reverse direction of the wire.

A belt or a chain may be used as the above-mentioned endless transmission strip, and a pulley, a roller, a sprocket or the like as the guide rings accordingly.

In the wire saw in accordance with the present invention, since the wire tension is constant, a large load is not applied to the wire, and thus the probability of a break in the wire is reduced.

Furthermore it is possible to simplify the mechanism used to advance the wire by the reciprocal movement, and an advantage of an extremely high processing precision is obtained by making sure that the circumferential speed in the normal direction and the reverse direction of the rotational movement of the drive roll in the roll group and the speed of travel in the normal direction and the reverse direction of the wire coincide.

DESCRIPTION OF THE PREFERRED EMBODIMENTS

Figure 1:
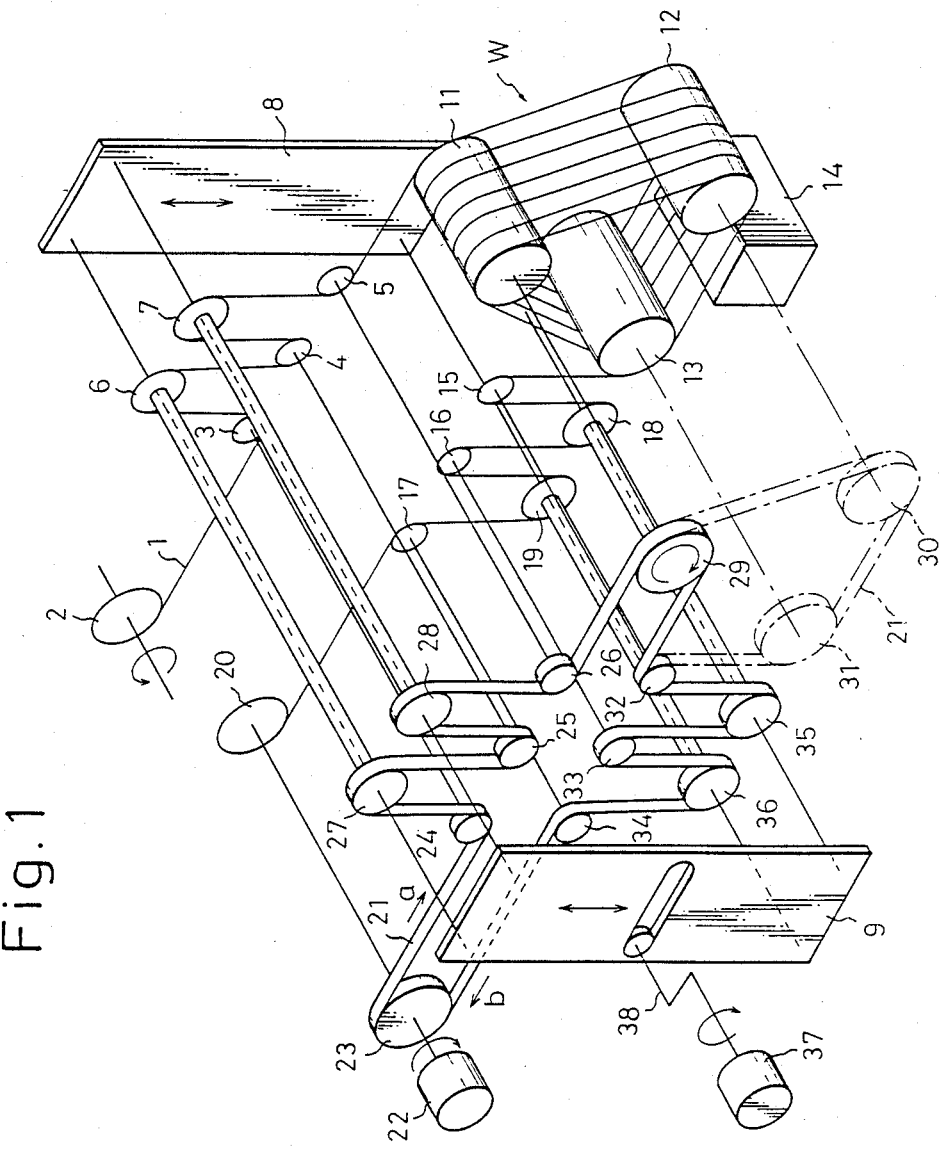
FIG. 1 is a perspective schematic view of an embodiment of a wire saw in accordance with the present invention.

The present invention will now be described in detail with reference to the drawing illustrating an embodiment of a wire saw in accordance with the present invention.

The FIGURE is a perspective view schematically illustrating a mechanism of a wire saw in accordance with the present invention. In the FIGURE, a wire 1 is supplied from a feed roller 2 having a sliding clutch, suspended on three fixed rollers 3, 4, and 5 capable of free rotation about their axes and supported on a frame or the like (not shown) of the wire saw, and led therefrom to a work station W. Rollers 6 and 7, capable of moving in an upward direction and a downward direction and supported on a slide frame 8 moving upward or downward in a vertical direction, are located between and above the fixed rollers 3, 4 and 5, respectively. The wire 1 is alternately wound around the fixed rollers 3, 4, and 5 and the movable rollers 6 and 7 in a zig zag fashion, as shown in the FIGURE.

At the work station W, the wire 1 is wound in a plurality of turns around a working roll group constituted by three working rolls 11, 12, and 13 pivotally supported in a substantially parallel state, and is advanced downward to an area of below the working rolls 11, 12, and 13 to shear a material to be sheared (not shown) fixed on a work table 14 which can raised or lowered.

The wire leaving the working rolls 11, 12, and 13 is wound in a zig zag fashion around three fixed rollers 15, 16, and 17 capable of free rotation about their axes and two movable rollers 18 and 19 located between and below the fixed rollers 15, 16, and 17 and supported by the movable slide frame 8, and is then led to a withdrawing roller 20.

A belt 21 used as an endless transmission strip for driving the drive roll 11 is wound around a pulley 23 rotated by a motor 22 and a pulley 29 fixed on a shaft of the drive roll 11.

In the onward passage illustrated by an arrow a, the belt 21 is wound alternately around three fixed pulleys 24, 25, and 26 supported on a frame (not shown) and two movable pulleys 27 and 28 located above the three fixed pulleys 24, 25, and 26 and supported by the slide frame 9, and in the return passage illustrated by an arrow b, the belt 21 is wound alternately around three fixed pulleys 32, 33, and 34 and two movable pulleys 35 and 36 located between and below the fixed pulleys 32, 33 and 34 and supported by the slide frame 9.

When a motor 22 is activated and the pulley 23 is rotated in the direction indicated by the arrow, the belt 21 is moved to rotate the pulley 29 in the direction indicated by the arrow thereon, thus driving drive roll 11.

The wire 1 is supplied under a constant tension from the feed roller 2 and is led to the withdrawing roller 20 by driving the drive roll 11.

The rotation of another motor 37 is transmitted through a crank 38 to the slide frames 8 and 9, and the slide frame 8 and the slide frame 9 are simultaneously raised or lowered in the same direction and by the same distance.

When the slide frames 8 and 9 are raised, the movable rollers 6, 7, 18, and 19 and the movable pulleys 27, 28, 35, and 36 supported on the slide frames 8 and 9 are moved in the upward direction. Accordingly, when the wire 1 is fed to the work station W, the movable rollers 6 and 7 and the movable pulleys 27 and 28 are moved away from the fixed rollers 3, 4, and 5 and the fixed pulleys 24, 25, and 26 in the direction perpendicular to the center axes of the fixed rollers 3, 4, and 5 and center axes of the corresponding fixed pulleys 24, 25, and 26, respectively, and when the wire 1 is withdrawn from the work station W, the movable rollers 18 and 19 and the movable pulleys 35 and 36 are moved toward the fixed rollers 15, 16, and 17 and the fixed pulleys 32, 33, and 34 in the direction perpendicular to the center axes of the fixed rollers 15, 16, and 17 and the center axes of the corresponding fixed pulleys 32, 33, and 34, respectively, and therefore, the movements toward and away are simultaneously performed by the same distance.

When he slide frames 8 and 9 is lowered, the movements of the movable rollers 6, 7, 18, and 19 and the movable pulleys 27, 28, 35, and 36 are reversed.

In the above-mentioned embodiment, the motor 22 is used to drive the belt 21, however the motor 22 may be used to rotate the wire feed roller 2 and withdrawing roller 20. Further, the belt 21 and the slide frames 8 and 9 can be driven by using one motor in place of the two motors as described above, i.e., the motor 22 for the belt 21 and the motor 37 for the slide frames 8 and 9.

Further, the belt 21 transmits the drive only to the roll 11 of the work station W, however it is possible for the drive to be simultaneously applied to the other rolls 12 and 13, as illustrated by chain-dot lines in the FIGURE.

The rolls 11, 12, and 13 at the work station W are pivotably supported in a substantially parallel manner, but the arrangement of rolls is not limited to that in which rolls are arranged in absolutely parallel to each other.

The feed roller 2 may be provided with a sliding clutch and a suitable constant tension control device. Further, preferably the withdrawing roller 20 is provided with a constant tension control device.

In the above-mentioned embodiment, the same number of movable rollers and movable pulleys are provided, and the movements toward and away are performed to the same distance. However, it is possible to adopt other constitutions, e.g., a constitution wherein one movable pulley and two movable rollers are provided and the slide frame 8 supporting the two movable rollers can be raised and lowered by an amount which is a half of that of the slide frame 9 supporting the one movable pulley, or another constitution in which the slide frame 8 and the slide frame 9 are raised and lowered by different distances. In these cases, the circumferential speed in the normal direction and the reverse direction of rotational movement of the drive roll may be made to coincide with the speed of travel in the normal direction and the reverse direction of the wire by using a variable speed means.

I claim:

1. A differential type rotational wire saw having a wire supplied from a wire feeding unit and wound around fixed rollers and at least one movable roller arranged upstream and downstream of a group of working rolls, at least one of which working rolls is driven, and said wire being gradually moved toward a wire withdrawing unit by a reciprocal movement of the wire on the working roll group caused by movements of the movable rollers toward or away from the fixed rollers;

an endless transmission strip for transmitting a drive force to at least one roll of said working roll group and wound around fixed guide rings and at least one movable guide ring moving toward or away from the fixed guide rings upstream and downstream of the working roll group, each fixed roller and each corresponding fixed guide ring, and each movable roller and each corresponding movable guide ring, being connected by parallel connecting rods, respectively;

a size of each fixed roller and a size of each movable roller being defined in such a manner that each portion of the wire between each fixed roller and each adjacent movable roller can be moved in a parallel direction, and a size of each fixed guide ring and a size of each movable guide ring being defined in such a manner that each portion of the endless transmission strip between each fixed guide ring and each adjacent movable guide ring can be moved in a parallel direction;

the movement of the at least one movable roller toward or away from the fixed rollers and of the at least one movable guide ring toward or away from the fixed rings upstream of the working roll group, and the movement of the at least one movable roller away from or toward the fixed rollers and of the at least one movable guide ring away from or toward the fixed guide rings downstream of the working roll group are simultaneously performed in a rectilinear direction, by moving simultaneously the at least one movable roller upstream of the working roll group and the at least one movable roller downstream of the working roll group in the same reciprocal direction.

2. A wire saw according to claim 1, wherein the transmission strip is a belt, and all the guide rings are a pulley.

3. A wire saw according to claim 1, wherein the transmission strip is a belt, and all the guide rings are a roller.

4. A wire saw according to claim 1, wherein the transmission strip is a chain, and all the guide rings are a sprocket.

* * * * *